(12) United States Patent
Darago et al.

(10) Patent No.: US 6,606,664 B2
(45) Date of Patent: *Aug. 12, 2003

(54) COMPUTER ARCHITECTURE FOR MANAGING COURSEWARE IN A SHARED USE OPERATING ENVIRONMENT

(75) Inventors: Vincent S Darago, Manasquan, NJ (US); Christopher Jenkins, Springville, UT (US)

(73) Assignee: Digital-Vending Services International, LLC, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/933,878

(22) Filed: Aug. 21, 2001

(65) Prior Publication Data

US 2002/0032784 A1 Mar. 14, 2002

Related U.S. Application Data

(60) Continuation of application No. 09/553,572, filed on Apr. 19, 2000, now Pat. No. 6,282,573, which is a division of application No. 09/272,221, filed on Mar. 18, 1999, now Pat. No. 6,170,014.
(60) Provisional application No. 60/079,302, filed on Mar. 25, 1998.

(51) Int. Cl.$^7$ .............................................. G06F 15/16
(52) U.S. Cl. ....................................... 709/229; 709/217
(58) Field of Search ................................ 709/229, 217, 709/225, 227; 370/260, 264, 265; 340/825.5

(56) References Cited

U.S. PATENT DOCUMENTS

| | | |
|---|---|---|
| 5,310,349 A | 5/1994 | Daniels et al. |
| 5,444,780 A | 8/1995 | Hartman, Jr. |
| 5,553,139 A | 9/1996 | Ross et al. |
| 5,719,786 A | 2/1998 | Nelson et al. |
| 5,758,069 A | 5/1998 | Olsen |
| 5,779,549 A | 7/1998 | Walker et al. |
| 5,862,223 A | 1/1999 | Walker et al. |
| 5,867,821 A | 2/1999 | Ballantyne et al. |
| 5,960,416 A | 9/1999 | Block |
| 5,966,695 A | 10/1999 | Melchione et al. |
| 5,974,409 A | 10/1999 | Sanu et al. |
| 5,974,446 A | 10/1999 | Sonnenreich et al. |
| 5,996,076 A | 11/1999 | Rowney et al. |
| 6,021,492 A | 2/2000 | May |
| 6,170,014 B1 * | 1/2001 | Darago et al. ............... 709/229 |
| 6,282,573 B1 * | 8/2001 | Darago et al. ............... 709/229 |

OTHER PUBLICATIONS

Printout from www.centerspan.com, pp. 1–26; no later than May 23, 2002.
Printout from www.scour.com, pp. 1–20; no later than May 23, 2002.
U.S. patent application, Pub. No. 20020059440 filed Sep. 5, 2001.

(List continued on next page.)

Primary Examiner—Zarni Maung
Assistant Examiner—Jason D. Cardone
(74) Attorney, Agent, or Firm—Computer Law++

(57) ABSTRACT

Methods, devices, and systems are provided in a multi-level computer architecture which provides improved capabilities for managing courseware and other content in a shared use operating environment such as a computer network. In particular, the invention provides a commercial networked instruction content delivery method and system which does not exclude synchronous sharing but is focused on asynchronous sharing. Security means in the architecture provide content property holders with the ability to know how many minutes of use an individual made of licensed material and with increased certainty that their material cannot be used, copied, or sold in usable form unless and until a user site is connected or reconnected to a minute-by-minute counter which is located off the premises of the user. This security link helps protect software and other works which are being sold or licensed to an individual, organization, or entity, and creates income opportunities for owners of such content.

27 Claims, 4 Drawing Sheets

OTHER PUBLICATIONS

U.S. patent application, Pub. No. 20020059499 filed Sep. 5, 2001.

"Architecture of Web–Based Training and Education System", Geoffrey C. Fox, *Proceedings of SC97 Conference San Jose*, Nov. 15–21, 1997, pp. 1–14.

"CMS Plus 6.0", 1998, pp. 1–6.

"Effortless Administration", *Mentorware, Inc.*, 1996–1997, pp. 1–14.

"Features Designed To Benefit Teachers", *SoftArc Inc.*, no later than Jan. 23, 1999, pp. 1–11.

"How Teachers Use Lancaster to Improve Teaching in the Lab", *COMPanion Corporation*, no later than Jun. 3, 1997, pp. 1–3.

"Internet Email Conferences: A Brief Primer", Barry McMullin, 1995–1996, pp. 1–2.

"Intranet–based Learning", *NETg*, 1998, pp. 1–6.

"KidDesk Family Edition for Windows", Stephen C. Steel, 1995, pp. 1–4.

"MacSUDS", *Integrated Technology (Europe) Ltd*, 1995, pp. 1–2.

"Lotus White Paper", *Lotus Development Corporation*, Nov. 1998, cover, frontispiece, and pp. 1–22.

"Mentorware Enterprise Education Server Data Sheet", *Mentorware, Inc.*, 1996–1997, pp. 1–5.

"Netscape's New Browser Is the Best One Yet", May 26, 1997, *Fortune*, pp. 1–4.

"On–Board Training and Operational Support Tools Applying Web Technologies", J. Auferil & L. Bessone, *ESA–ESRIN ID/D.*, Feb. 1997, pp. 1–14.

"QuestWriter", IQ Documentation Team, Jul. 19, 1997, pp. 1–3.

"Quick Evolutionary Tale", *W.W. Norton & Company, Inc.*, May 25, 1998, pp. 1–2.

"Re: .pix extension", Ben Isaacs, May 5, 1997, p. 1.

"An Update on WebCT (World–Wide–Web Course Tools)—a Tool for the Creation of Sophisticated Web–Based Learning Environments", Murray W. Goldberg and Sasan Salari, *Proceedings of NAUWeb '97*, Jun. 12–15, 1997, pp. 1–12.

"Virtual–U Version 2.3 Fact Sheet", *Virtual Learning Environments Inc.*, 1998, pp. 1–6.

"WBT Manager", *Integrity Training, Inc.*, 1996–1999, pp. 1–2.

"WBT Systems—White Paper", no later than Jan. 22, 1999, pp. 1–6.

"Web Course in a Box Version 3.0", *MadDuck Technologies*, Sep. 9, 1997, pp. 1–2.

"WebBoard Product Info: Overview", Pierre Granchamp, *O'Reilly & Associates, Inc.*, 1998, pp. 1–5.

"What Can an IMS Do?*", Bruce Landon, Dec. 16, 1998, pp. 1–14.

National Guard Bureau Operational Requirements Document for a Distributed Training Technology System, Nov. 1998.

Petition for Special Examining Procedure, from parent case 09/272,221.

Decision on Petition to Make Special, from parent case 09/272,221.

Office Action mailed Mar. 15, 2000, from parent case 09/272,221.

Response filed Mar. 24, 2000, from parent case 09/272,221.

Office Action mailed Apr. 7, 2000, from parent case 09/272,221.

Response filed Apr. 17, 2000, from parent case 09/272,221.

http://rhapsody.listen.com/partners/con_providers.html; no later than Dec. 4, 2001.

* cited by examiner

COMPUTER ARCHITECTURE FOR MANAGING COURSEWARE IN A SHARED USE OPERATING ENVIRONMENT

RELATED APPLICATIONS

This application is a continuation of U.S. patent application Ser. No. 09/553,572 filed Apr. 19, 2000, now issued as U.S. Pat. No. 6,282,573, which is a division of U.S. patent application Ser. No. 09/272,221 filed Mar. 18, 1999, now issued as U.S. Pat. No. 6,170,014, which claims priority to U.S. Provisional Patent Application Serial No. 60/079,302 filed Mar. 25, 1998.

FIELD OF THE INVENTION

The present invention relates to content delivery over a large computer network, and more particularly to a computer network architecture which integrates management components such as a reservation system, a funds flow system, a metering system, and a security system for preventing unauthorized use of courseware and other content.

TECHNICAL BACKGROUND OF THE INVENTION

More and more paintings, pictures, books, songs, other performances, texts, diagrams, recordings, video clips, and courses utilizing them for instructional purposes and/or entertainment are becoming available in machine readable forms. In particular, many computer-assisted lessons, training materials, and other instructional courses include works which can be protected under intellectual property laws, such as visual works, audio works, texts, examinations, simulations, and other works. Some sensory works experienced while using computers, such as the physical motions performed with a flight simulator, may also be protected. Still other computer-aided sensory experiences are foreseeable but not yet commercially implemented, such as smells that could enhance a fire fighting course or a course on the detection of illegal drugs. These will also benefit from protection.

"Computerized training", "computer-assisted instruction", "computer-aided learning", "web-based training", "intranet-based learning", "web courses", "virtual university", "computerized curriculum delivery system", "courseware delivery system", "instructional management system", "interactive educational method", and similar phrases are used by various people in various ways, but each of these terms refers to efforts to use computers to help educate students. As used here, "students" are not necessarily traditional students enrolled in high schools, colleges, universities, and the like, but are rather people who receive instruction through courseware. Courseware may be used by traditional students, but it may also be used by employees of government agencies and corporations, for instance.

To better understand the present invention in the context of existing computer-assisted educational efforts, it will helpful to understand certain distinctions, including without limitation the following:

Course authoring vs. course content delivery;

Stand-alone computer-based training vs. networked instruction;

Synchronous sharing vs. asynchronous sharing;

Commercial systems vs. academic systems; and

Technical vs. legal means for securing intellectual property.

Courseware vs. other content

Authoring vs. Delivery

Many uses of computers to facilitate education focus on providing authoring tools and authoring environments. For instance, tools for authoring include tools for re-formatting text into HTML format and adding hyperlinks; tools for integrating audio and/or video content with text content; and tools for creating interactive forms to obtain information from students and provide appropriate responses. In short, authoring tools help instructors create courseware content.

By contrast, delivery tools help deliver courseware to students. In the case of "web-based training", "intranet-based learning", and "web courses", delivery tools typically include TCP/IP networks and web browsers. Computer workstations themselves may also be viewed as delivery tools, particularly when the courseware is written to be used on a stand-alone computer rather than being delivered over a network connection.

Many existing approaches to computer-aided teaching include both authoring and delivery components. However, the problems and solutions associated with authoring are not necessarily the same as those associated with delivery. The present invention is concerned primarily with delivery as opposed to authoring.

Stand-alone vs. Networked Instruction

Many computer-based training systems do not require a network connection in order to function. All necessary courseware content is stored on a computer disk, CD-ROM, or other medium which is directly accessible to the computer being used by the student, making it unnecessary to send any content over a network connection. The tools and techniques for managing courseware content in such stand-alone systems are basically the same as the tools and techniques for managing application programs, operating systems, and other types of software installed on user workstations, namely written licenses, disk copy-protection schemes, license serial numbers, and the like.

By contrast, network-based training approaches either take advantage of a network connection if one is available, or else they require such a connection. Different network-based systems use the network in different ways. Sometimes courseware content is stored on a server and delivered over the network to users as needed. In some cases, part or all of the content is stored on the local network node but licensing is enforced through a server. For instance, the content stored locally might be encrypted, and the decryption key might be available only from the server and then only after the user is authenticated. Some network-based educational systems allow students to interact with one another and/or with the instructor through email or chat rooms. Some systems administer tests by having the student send test answers to a server, which grades the test and notifies the student of the results. Some systems provide instructors with access over the network to a database of administrative information such as student grades and a list of the students who have viewed a given lesson. Of course, many systems combine one or more of these features and some also use networks in other ways.

The present invention is concerned with network-based courseware delivery systems, as opposed to stand-alone courseware delivery systems.

Synchronous vs. Asynchronous Sharing

Networked courseware delivery systems may share content between multiple users synchronously or asynchronously. With synchronous sharing, users and/or instructors exchange information in a real-time or interactive way. Examples of synchronous sharing include telephone conversations, video conferencing, and chat rooms. By contrast, asynchronous sharing involves an exchange of information in which the participants expect substantial delays, or they involve a one-way flow of information rather than an exchange. Examples of asynchronous sharing include downloading a previously created multimedia presentation, listserv exchanges, and Usenet postings. Email does not fit neatly in either category, because it can be either synchronous or asynchronous in practice.

Some aspects of the present invention are concerned with asynchronous sharing, and in particular with asynchronous delivery of previously created courseware content. However, other aspects of the invention are concerned with synchronous information exchanges, such as funds transfers.

Commercial Systems vs. Academic Systems

As noted, some courseware students attend traditional institutions of higher education. In many cases, those students pay for their use of courseware by paying tuition to the institution. If the institution is not the owner of the courseware, the institution then makes separate arrangements for payment to the owner. Likewise, students who are employees of a government agency or corporation generally receive access to courseware through their employer without personally making arrangements to pay the courseware owner directly. In either case, at the time a student sits down to actually use the course-ware it may be necessary to authenticate the student to the system but it is not necessary for the student to provide a credit card number or similar payment mechanism. For convenience, courseware management systems which do not require direct payment from students are referred to herein as "academic systems".

By contrast, in "commercial systems" some provision must be made for funds transfer before a student is given full access to courseware content (although a demo might be available at no charge). For instance, each student may be required to provide a credit card number, to pre-pay for access by giving cash or a check to an attendant, or to provide individual billing information if credit is being extended.

The present invention is concerned primarily with commercial courseware delivery systems as opposed to academic courseware delivery systems.

Technical vs. Legal Security

As time passes, personal computers and other computational devices are able to record into machine readable form more and more complex presentations or experiences. For example, personal computers in the 1980's mainly manipulated words, numbers, and characters; in the 1990's manipulation of icons, images, audio and video has become commonplace. The next step may include widespread use of motion, as in simulators, and perhaps smell or other additions. As the complexity of the process needed to place these words, images, and other sensory experiences into machine readable form increases, the value of computer software that presents these experiences increases. This increases in turn the value of a security system which enforces courseware license agreements.

Intellectual property rights are provided by copyright and other laws to encourage creative effort by artists, authors, and other people who create paintings, photographs, animations, musical works, instructional texts, and other works. These works can be stored, presented, and utilized in many ways. With the increasing availability of powerful computers, many works that were traditionally available on paper, canvas, or tape are now stored in computer hard drives and computer RAM (random access memory), and are displayed on computer monitors such as cathode ray tube screens and liquid crystal displays.

Early computers provided minimal technical security means. On early personal computers, for instance, typing "copy *.*" would direct the computer to copy every file or program in a directory. Further simple keystrokes, such as "copy C:/*.* A:/*.*" would direct the computer to place the new copies in a new physical location, perhaps copying everything from a disk directory in drive C to a portable disk in drive A. Even today most personal computers routinely provide an environment that makes it relatively easy to copy electronic information in the form of files.

Of course, technical means are not the only way to protect intellectual property rights; legal tools in the form of license agreements are widely used. Perhaps the most widespread license agreement is a single workstation agreement. In exchange for a license fee or an outright purchase price, a set of disks or a CD-ROM containing digitized works and/or executable code is transferred to the purchaser, often with books and/or instructions on paper. Sometimes the works are transferred over a network such as the Internet in digital form. The purchaser is typically informed that the code or information may be used an unlimited number of times on a single workstation or other computer.

This approach worked fairly well in the day of the stand-alone personal computer. It does require that the producer of the code or other protectable work place some trust in the buyer, since the buyer often could copy the code or information onto more than one computer. The barriers were mainly legal, not technical. In locations where intellectual property was not a well-established and respected concept, widespread copying of information and executable code reduced income and profits to producers of computer based information and applications by diverting income and profits to illicit "factories" which reproduced computer disks and CD-ROMs without permission from the rightful owner.

Many technical protection schemes were developed to combat the ability of the market to reproduce information without payment to the owner. Some "copy-protection" schemes made it difficult to make copies, regardless of the legitimacy (e.g. for unauthorized resale versus for proper backup) of the copies.

Other schemes defined zones of control on a CD-ROM and made a "key" necessary to read the zones. For instance, if a CD-ROM had 600 megabytes of information on it, a person might buy the legal right to see, view, or use 100 megabytes for $50.00. Information would be available in the first 100 megabyte zone regarding the contents and cost of information in the second or third 100 megabytes. For an additional fee or fees, the viewer could obtain the key to additional segments of the CD-ROM. For instance, a second $50 might buy the right to use the second 100 megabytes and a third $50 fee might permit the use of the third 100 megabytes.

A problem with this approach (and with copy-protection schemes) is that once a single purchase has been made of all the information, or access to all the information on the disk or CD-ROM has been obtained once, the information could be reproduced at will. An unauthorized factory could produce thousands of copies to be resold with no benefit to the rightful owner of the intellectual property.

Similar problems exist with the site license approach to protecting intellectual property. A licensed site such as a corporation or a government agency obtains the right to use a program or digitized information from the intellectual property owner, and is given a set of disks, CD-ROMs, or file-server-based copies of the licensed work for authorized internal use. The intellectual property owner relies upon the corporation or agency not to share the information or program outside the bounds of the license. But the major tool for enforcing the license agreement was not technical. Instead, it was respect for the law and the agreement. Unfortunately, some corporations and even some government agencies were staffed, at least in part, by people willing to take home a copy of the software or other licensed work and share it or sell it to an illegal copying factory.

Under a common relationship between works of intellectual property and the Internet, users view courseware and other information for free. The information is shared for free because providing the information helps the work's owner sell a product, or saves the owner money by reducing technical support costs, for example. In the research community, huge sets of information are regularly exchanged via file transfer protocol or other digital means. Similarly, information in courses can be made available on the web, and can be viewed via a browser.

The present invention relates to protecting content both by technical means and by legal mechanisms. Although some information may be shared for free within a system according to the invention, much of the information available through the inventive system is provided only in exchange for license fees or the like paid by students or their employers.

Courseware v. Other Content

Those of skill in the art will recognize that many of the comments above apply not only to courseware, but also to other types of digital content, including without limitation musical recordings, visual images, and the like. Such content may appear as components of multimedia courseware, but it may also be distributed independently of courseware and/or for purposes other than education. As used herein, "content" includes both courseware and other kinds of digital content.

Additional Considerations

In addition to the considerations above, certain trends are worth noting. Many courses are available on the web, yet in general the more attractive the course is (visually, in activity, motion, video, sound, and so on), the more time it takes to refresh the computer screen at the user's workstation. To reduce download time, more and more bandwidth is requested. Users go from a POTS ("plain old telephone system") line, to an ISDN line to a T1 line, with increasing costs at each stage. However, the cost of computer storage is dropping rapidly. As most machine readable classes remain less than a gigabyte in size, the cost of forward storing a machine-readable class to the personal computer owner wishing to take the class is dropping rapidly.

As the speed of market developments in the computer industry increase, the delay and cost of obtaining legal remedies increase, and the technical ease of copying and distributing electronic information increases dramatically with the interconnections available via the Internet, improved tools for managing courseware are needed.

As discussed above, a wide range of computer-assisted educational features and capabilities have been explored, at least to some extent. However, existing approaches have been less successful at combining these features and capabilities into an architecture which securely and effectively shares commercial courseware. Accordingly, it would be an advancement in the art to provide an improved computer architecture for sharing commercial courseware and other content over a network.

BRIEF SUMMARY OF THE INVENTION

The present invention provides improved capabilities for managing courseware and other content in a shared use operating environment such as a computer network. In particular, the invention provides a commercial networked content delivery method and system which does not exclude synchronous sharing but is focused on asynchronous sharing.

One method of the invention operates in a network containing a registration server, a content server connected to the registration server, and several client work-stations connected to the content server. After a user registers with the registration server and requests access, the content server authenticates the request and serves the content to the client workstation for presentation to the user. Content may be moved by the system between content servers in response to actual or anticipated user requests; users may reserve courses for later viewing. If the target content server lacks room to receive the incoming content, the system makes a recommendation to the local administrator as to which content should be deleted from the content server in order to make additional room.

Courseware and other content managed by the system may contain one or more "critical portions" which have been treated to prevent their unauthorized use and thereby enhance the protection of intellectual property rights in the content by technical means. For example, the treating step may insert disabling code into an executable portion of courseware, may encapsulate the critical portion in a database table, may compress the critical portion, and/or may encrypt the critical portion. In addition, the content server and/or client workstation may disable use of a critical portion if an expected security handshake is not received. Caching and other disk writes at the client may also be disabled to prevent a permanent copy of the critical portion from being created at the client. To take advantage of low cost telephone connections, part or all of the content may be downloaded to the client workstation one or more hours before serving the critical portion.

The system also monitors the connection between content server and client, and meters use of the content so that the user pays only for actual use. Pre-existing works can be metered without being modified. In some cases, however, a metering security module is injected by linking or recompilation into the machine readable form of a work that contains legally protectable intellectual property. Adding the metering security module alters the system, such as by inserting disabling code, so that the system will not play or display the content unless the metering security module is operating. "Playing" a work includes displaying it, executing it, digitally manipulating it, or otherwise performing an act governed by the license agreement or by relevant intellectual property law. Unless the metering security module is engaged and authorizes the use, a monitor will not display certain protected words or images or motion images, speakers will not play certain protected sounds, motion simulators will not perform certain protected motions, and so forth.

The user receives an invoice for use of the courseware or other content. A local administrator can be authorized to adjust invoices in response to user requests. For instance, the administrator may determine that the user did not finish viewing the course in question, or accidentally started the wrong course, and then reduce the charges on that basis. If the user previously provided a credit card payment authorization to permit payment by credit card, a finds flow manager makes appropriate adjustments to the credit card charges.

In short, the architecture of the present invention provides improved security, efficiency, and convenience for the management of courseware or other content in a shared operating environment such as a network or a collection of loosely coupled networks. For instance, additional security is provided by separating registration information from content, by identifying and treating critical portions, and by monitoring the connection over which content is supplied to a client. Convenience and efficiency are provided by optional early downloading, by reservation capabilities, and by a combination of automatic and local administrator control. Additional features and advantages of the present invention will become more fully apparent through the following description.

BRIEF DESCRIPTION OF THE DRAWINGS

To illustrate the manner in which the advantages and features of the invention, are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

The present invention relates to methods, systems, and configured storage media for managing courseware and/or other content in a shared use operating environment. Courseware includes digital instructional and/or entertainment content in the form of software, digitized sounds, digitized images, digitized motion paths, digitized chemical compounds, and other works which can be transmitted over a computer network for presentation to a user and which contain intellectual property that is protectable by copyright, patent, trade secret, trademark, trade dress, moral rights, common law rights, contract, and/or other sources of legal authority. Courseware is sometimes referred to herein as a "course" or "class" or "work" or "content"; "content" and "work" are used interchangeably to describe material of which courseware is just one example. Specific examples of courseware and other content are given to illustrate aspects of the invention, but those of skill in the art will understand that other examples may also fall within the scope of the invention.

A shared use operating environment is an environment in which more than one person can use content, without necessarily sharing a specific copy of that content, with the assistance of a computer network or a collection of coupled networks. As used here, "network" includes local area networks, wide area networks, metropolitan area networks, and/or various "Internet" networks such as the World Wide Web, a private Internet, a secure Internet, a value-added network, a virtual private network, an extranet, or an intranet.

Overview of the Architecture

Figure 1:
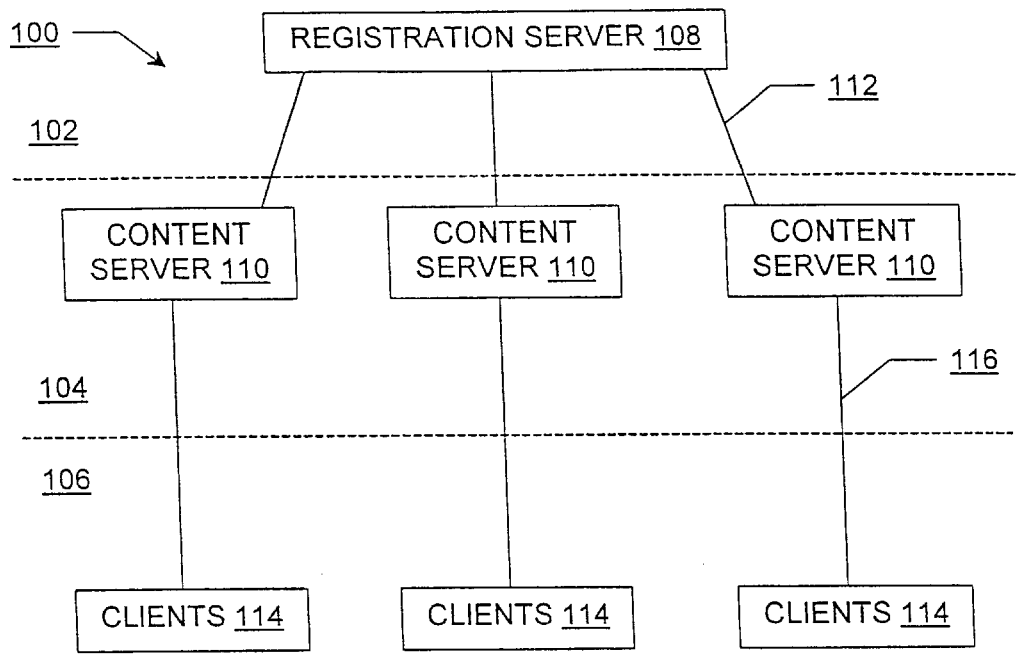
FIG. 1 is a diagram illustrating a network architecture according to the present invention, including a registration server, several content servers, and several clients.

FIG. 1 illustrates generally an architecture 100 of a shared use operating environment according to the present invention. The architecture 100 includes at least three levels which are defined according to the functionality and data that are present and/or intentionally omitted from each level. Those of skill in the art will appreciate that the levels may be being named differently in various embodiments, but for clarity they are referred to herein as a registration server level 102, a content server level 104, and a client level 106.

The registration server level 102 includes at least one registration server 108. The functionality and data associated with the registration server(s) 108 are described in detail below. At this point, it is sufficient to note that each registration server 108 includes a remote registration manager and a registration database for new user registration, and that each registration server 108 is free of courseware or other deliverable content that is managed by the architecture 100. In particular, courseware is not stored on the registration server 108.

The content server level 104 includes at least one content server 110. For clarity of illustration, three content servers 110 are shown, but an embodiment of the invention may include one or more servers 110. Each content server 110 is linked by a link 112 for network communications with a registration server 108. In an embodiment containing a single registration server 108, such as the embodiment illustrated, each content server 110 thus has a network connection 112 (or may readily obtain such a connection) to that registration server 108. In embodiments containing more than one registration server 108, different content servers 110 may communicate over one or more network links 112 with one or more of the registration servers 108. Each network link 112 may involve a dedicated link, a virtual circuit, a tunnel through one or more intervening networks, or one or more other types of network communication links known to those of skill in the art.

Each content server 110 contains courseware and/or other works managed by the architecture. Like the registration server 108, a content server 110 may also contain data which is not managed by the architecture and which is thus of no concern here unless it interferes with operation of the system 100. Each content server 110 serves the managed content for presentation to registered users, that is, users who have previously been registered with the registration server 108. At a minimum, registration provides users with a unique user name or user ID; it may also coordinate a password or otherwise manage access control. With the possible exception of registration for free demonstrations, which may be available in some embodiments, registration also obtains billing or payment information such as the user's credit card information, purchase order, and/or sponsor identity.

The registration server 108 and the content server(s) 110 may be implemented with a combination of computer hardware (e.g., disk or other non-volatile storage, RAM or other volatile storage, one or more processors, network interface cards, supporting I/0 equipment) and computer software (e.g., operating system software, networking software, web browser software, and inventive software as described herein). In particular, suitable software for implementing the invention is readily provided by those of skill in the art using the teachings presented here and programming languages and tools such as Java, Pascal, C++, C, CGI, Perl, SQL, APIs, SDKs, assembly, firmware, microcode, and/or other languages and tools. A given computer may host several content servers 110, or it may host several registration servers 108, but a content server 110 and a registration server 108 may not reside on the same computer because that would violate the requirement that registration servers 108 not contain courseware.

The client level 106 includes at least one client workstation 114, and typically includes multiple workstations 114. Each client workstation 114 is connectable to a content server 110 by a client-server network communications link 116, such as a local area network link. At some point, each client workstation 114 is able to present, to at least one registered user, courseware and/or other content which is served over the link 116 by the content server 110. The content may be conventional content, or it may be modified by treating critical portions as described herein, or it may be a combination of untreated and treated works. Although clients 114 are referred to as workstations in deference to the expected typical situation, it will become clear that laptops and other computers may also serve as clients 114.

Figure 2:
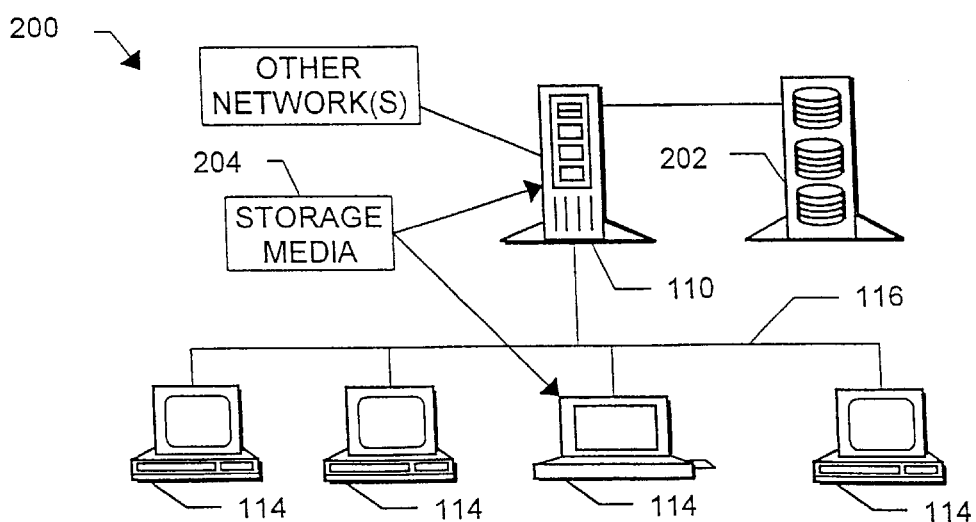
FIG. 2 is a diagram further illustrating a portion of the network architecture of FIG. 1, including a content server and several clients.
Figure 3:
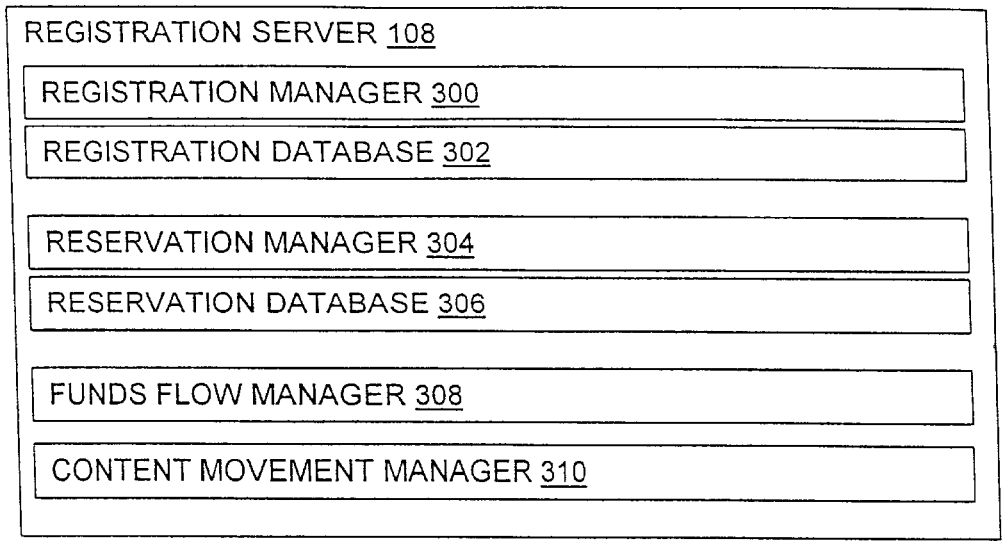
FIG. 3 is a diagram further illustrating a registration server.
Figure 4:
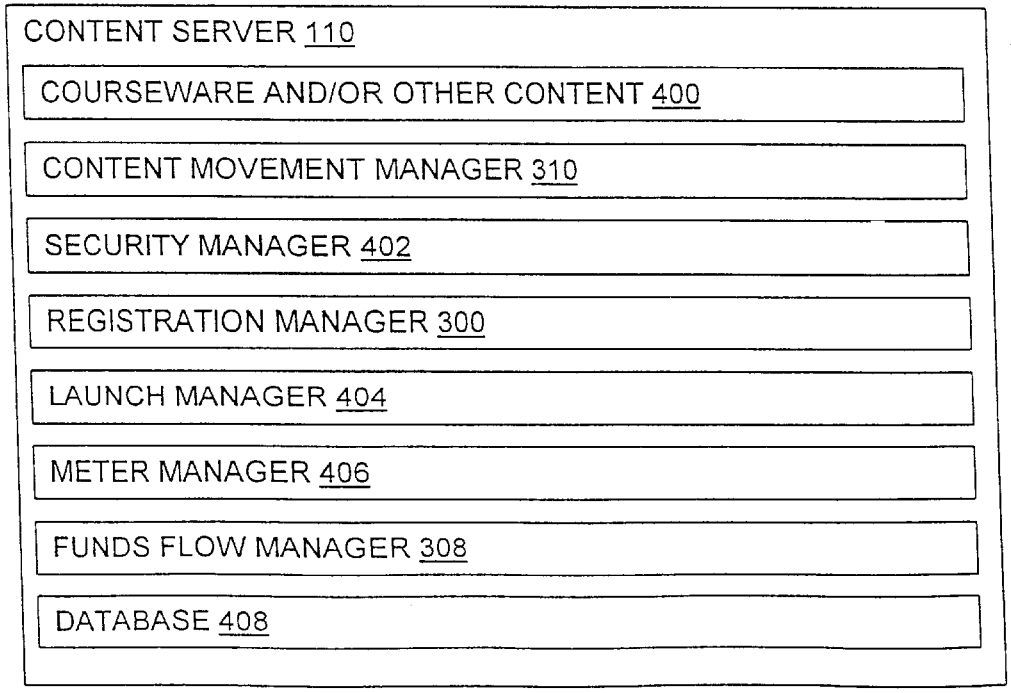
FIG. 4 is a diagram further illustrating a content server.
Figure 5:
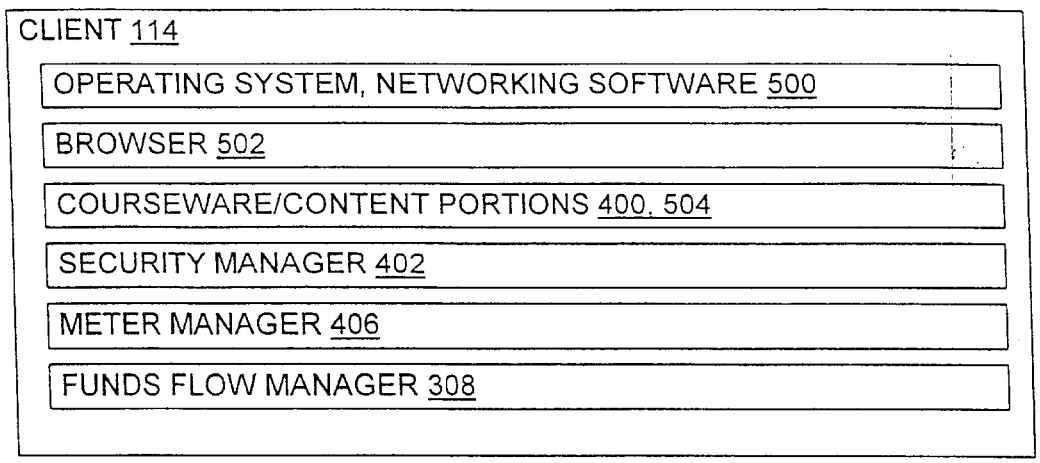
FIG. 5 is a diagram further illustrating a client of a content server.

Registration servers 108, content servers 110, and clients 114 are further illustrated in FIGS. 3, 4, and 5, respectively. However, before describing those three Figures the relationship between content servers 110 and clients 114 is discussed with reference to FIG. 2, and the relationship between registration servers 108 and content servers 110 shown in FIG. 1 is described in greater detail.

A Network of Content Servers and Clients

FIG. 2 further illustrates one of many possible client-server networks 200 suitable for use according to the invention. The network 200 includes one content server 110 and four clients 114. Other suitable content-server-client networks 200 may contain other combinations of content servers 110, clients 114, and/or peer-to-peer nodes which perform as content servers 110 and/or clients 114 according to the invention; with appropriate software, a given computer may function both as a client 114 and as a server 110. The computers 110, 114 connected in a suitable network 200 may be workstations, laptop computers, disconnectable mobile computers, uniprocessor or multi-processor machines, mainframes, so-called "network computers" or "lean clients", personal digital assistants, or a combination thereof. Nonvolatile storage 202, printers (not shown), and other devices may also be connected to the network 200.

The network 200 may include communications or networking software such as the software available from Novell, Microsoft, Artisoft, SCO, and other vendors, and may operate using TCP/IP, SPX, IPX, and other protocols over connections 116 that include twisted pair, coaxial, or optical fiber cables, telephone lines, satellites, microwave relays, modulated AC power lines, and/or other data transmission "wires" known to those of skill in the art. The network 200 may encompass smaller networks and/or be connectable to other networks through a gateway or similar mechanism.

As suggested by FIG. 2, at least one of the computers 110, 114 is capable of using a floppy drive, tape drive, optical drive, magneto-optical drive, or other means to read a storage medium 204. A suitable storage medium 204 includes a magnetic, optical, or other computer-readable storage device having a specific physical configuration. Suitable storage devices include floppy disks, hard disks, tape, CD-ROMs, PROMs, random access memory, and other computer system storage devices. The physical configuration represents data and instructions which cause the computer system to operate in a specific and predefined manner as described herein. Thus, the medium 204 tangibly embodies a program, functions, and/or instructions that are executable by computer(s) to assist content management generally, and license enforcement in particular, substantially as described herein. As used herein, "executable" includes "interpretable"; executable code thus includes compiled code as well as codes like Java byte codes or interpreted BASIC statements.

A Network of Registration Servers and Content Servers

As noted, the network 200 involves at least one content server level 104 computer and one or more client level 106 computers 114. Some of the characteristics of the network 200 may also apply to networks, such as that shown in the upper two-thirds of FIG. 1, which involve the registration server level 102 and the content server level 104.

For instance, the computers 108, 110 may be workstations, uniprocessor or multi-processor servers, mainframes, or a combination thereof such as a cluster. Nonvolatile storage such as a disk array and/or other devices may be connected to the computers 108, 110. The computers 108, 110 may be linked by communications or networking software such as the software available from various vendors and may operate using TCP/IP and/or other protocols over connections 112 that include data transmission "wires", as described above. The computers 108, 110 may likewise be part of a network which encompasses smaller networks and/or is connectable to other networks. Finally, the computers 108, 110 may be capable of using a drive or other means to read a configured storage medium 204.

One example of a network 200 suitable for a metered security relationship is a network holding several thousand machine readable courses. A conventional approach charging one fee for unlimited use of each machine readable course by a single personal computer 114 or a single location (e.g., a corporation or agency) would be prohibitively expensive. In an embodiment according to the invention, the secured courseware or other content can be shared by various users, and each minute of use is counted and billed to the user or to the sponsor of the user (e.g., the corporation or agency employing the user). Unlimited use is not required, and the license fee is reduced accordingly.

Registration Server

FIG. 3 further illustrates a registration server 108. The registration server 108 includes at least a portion of a registration manager 300 and of a corresponding user registration database 302. Collectively, the manager 300 and the database 302 form a registration module which provides at least unique user IDs and user password support. The registration module may also obtain and store in the database 302 information such as the identity of a corporate or government sponsor that employs the user, and the user's email address for use in notifications of upcoming services or events.

The proposed user ID and password are checked against existing registration information in the database 302 to make certain they are unique throughout the architecture 100 embodiment. This provides security to users so that charges for services will be valid and services cannot be stolen by an unknown or duplicate user and then charged to the wrong user ID. Of course, users must still be careful to keep their own password information confidential and to choose passwords which are not simply a copy of their username or other easily guessed information. User login and authentication tools and techniques familiar to those of skill in the art may be used.

Security is enhanced by making all new registrations go through the registration server 108. New user registration information is processed on the registration server 108; user registrations cannot be created by any content server 110. The updated registration database 302 is replicated in a read-only format to content servers 110 so they can recognize registered users, but a new user registration cannot be created directly on a content server 110. One advantage of this approach to users is that they need not repeat registration information each time they log onto a client 114. Registration database 302 replication may be performed using Oracle 8.0 enterprise software or other familiar means.

As illustrated in FIGS. 3 and 4, in one embodiment of the architecture 100 a portion of the registration module resides on each registration server 108 and a portion resides on each content server 110. Other embodiments may distribute registration module functionality differently between the three levels 102, 104, 106, subject to the appended claims. Those of skill in the art will readily implement the registration manager 300 based on commercially available tools and languages such as C++ or Java and the description given herein. The database 302 may likewise be implemented as an Oracle database or in another familiar database format. In one embodiment, Java software in the registration manager 300 is used to write new user registration information to an Oracle database 302. ORACLE is a mark of Oracle Corporation.

The registration server further includes a reservation manager 304 and a reservation database 306. Collectively, the manager 304 and the database 306 form a reservation module which permits registered users to reserve courseware or other content. In combination with the funds flow system described herein, the reservation module allows a user to book a guaranteed seat, a classroom, or another service, secure in the knowledge that it will be held for them until the specified time. In some embodiments, the funds flow system will charge users for such guaranteed resource reservations regardless of whether the resource is actually used, because the resource was kept unavailable for use by others. The reservation module can present a user with a menu or a schedule of courseware presentation events in various classrooms or other locations. It can also tell the user whether a given courseware event or piece of content is available at a given time and whether a particular work is already scheduled for use at that time.

Other embodiments may distribute reservation module functionality differently than shown between the three levels 102, 104, 106, subject to the appended claims. In one embodiment, the reservation module includes commercial off-the-shelf scheduling software provided by AC&E Ltd. of Chantilly, Va.; in other embodiments, other scheduling software may be used. The reservation manager 304 may also be implemented using commercially available tools and languages such as C++ or Java and the description given herein. The database 306 may be implemented as an Oracle database or in another familiar database format.

The illustrated registration server 108 also includes at least part of a funds flow manager 308 which manages content usage payment information. As illustrated in FIGS. 3–5, in one embodiment of the architecture 100 a portion of the funds flow manager 308 resides on each client workstation 114, a portion resides on each content server 110, and a portion resides on each registration server 108. Other embodiments may distribute funds flow management functionality differently between the three levels 102, 104, 106, subject to the appended claims.

The funds flow manager 308 accepts payment information such as a purchase order number or a credit card authorization. If payment is to be made by credit card, the funds flow manager 308 places a hold with the credit card provider or bank before the courseware and/or other content is presented. In connection with sending the user the final invoice, the funds flow manager 308 contacts the bank to transfer funds from the user's account or the sponsor's account to the service provider's account or the content owner's account.

The funds flow manager 308 makes customer interactions with the system 100 faster and more effective. For example, upon first using the system 100, the user may provide a billing code such as a corporate purchase order number or credit card number. Once this information is accepted by the funds flow manager 308, the user may make it the default payment option to be applied when logging out after future service purchases.

The funds flow manager 308 may also provide a custom menu to users. For instance, the system 100 may be configured so that only courses approved by a particular entity are displayed if the user identified that entity as its sponsor while signing on. If this same user wishes to see other courses, the user may log out and then login again as an individual client, after which all courses available for individuals (whether employed by the sponsor in question or not) will be displayed as possible selections.

The illustrated registration server 108 also includes at least part of a content movement manager 310 which moves courseware and/or other content to content servers 110 in response to actual or anticipated requests from users for access. As illustrated in FIGS. 3 and 4, in one embodiment of the architecture 100 a portion of the content movement manager 310 resides on each content server 110 and a portion resides on each registration server 108. Other embodiments may place all content movement management functionality at the content server level 104.

The content movement manager 310 interacts with scheduling software such as the reservation module and a launch manager 404 which is discussed below. When a user selects courseware and/or other content for use at a given location, the scheduler determines whether the content is already resident on a content server 110 at or near the requested location. This determination may be made by reference to a database which tracks content locations, or by making an inquiry to the local content server(s) 110.

If the content is not resident at the desired location, the scheduler places a call to the content movement manager 310. The content is automatically packaged for shipment from another content server 110 by FTP (file transfer protocol) or other familiar means, with appropriate encryption and/or compression. The source content server 110 may be a typical content server 110 as described above, or it may be a master content server 110. Each master content server 110 serves primarily as a content repository for other content servers 110, as opposed to serving primarily as a source of content for directly attached clients 114.

The content movement manager 310 checks with the target content server 110 to determine whether sufficient disk space is available to receive the incoming content. If there is not enough space, the content movement manager 310 makes a recommendation to a local administrator regarding which content to delete to make room for the incoming content. The recommendation may be based on various factors, including storage requirements and which courseware at the target server 110 was used most recently or is scheduled for use. For instance, if a course has not been used for several months and has not been reserved, the content movement manager 310 is more likely to recommend that it be deleted than if it was used more recently or has been reserved. In one embodiment, the content movement manager 310 cannot delete content; only the local site administrator can.

Some embodiments of the architecture 100 include a backup registration server 108 which contains data mirrored from the primary registration server 108 shown in FIG. 1. As usual with mirrored systems, the backup server 108 will generally be in a different physical location than the primary server 108. Data mirroring tools and techniques familiar in the art may be used.

In addition to the functionality described above, the registration server 108 may provide advertising and other inducements for Web walkers and potential users of the system 100 to become familiar with the system 100, and to register for services provided through the system 100.

Content Server

FIG. 4 further illustrates a content server 110. The content server 110 includes operating system software and networking software, such as Windows NT operating system software, UNIX or Linux operating system software, Ethernet or NetWare networking software, and/or other software discussed in connection with FIG. 2. UNIX is a mark of Unix System Laboratories, inc.; LINUX is a mark of Linus Torvalds; NETWARE is a mark of Novell, Inc.

Unlike the registration server 108, the content server 110 contains courseware and/or other managed content 400. The content 400 may take a variety of forms, including software, video, audio and other types of digital content. The content 400 may also be treated according to the present invention by identifying critical portions and providing enhanced security for those portions. Security for the content 400 as a whole is also provided by a security manager 402, which monitors use of the content 400. In the illustrated embodiment, a portion of the security manager 402 resides on each client workstation 114 and a portion resides on each content server 110. In alternative embodiments, the security manager 402 may reside entirely on the content server 110 or entirely on the client 114.

As illustrated, a portion of the registration manager 300 resides on the content server 110. At the content server level 104, the registration manager 300 only needs to recognize registered users and provide them with access to content 400. New users are created at the registration server level 102. In one embodiment, the registration manager 300 includes dynamic HTML and/or commercially available Oracle Web Application Server software, from Oracle Corporation of Redwood Shores, Calif. Use of the Oracle software may require that a portion of the registration manager 300 also reside on each client 114 and/or on the registration server 108.

Critical portions of the content 400 may reside in database tables managed by the security manager 402. For example, executable portions of content or synchronization information for coordinating audio and video in content may be stored in a database table. Database table names do not necessarily reflect content in the straightforward manner in which more typical content file names can reflect file content. Also, database tables may be difficult to access directly through the file system; it may be necessary to go through the database management software. Accordingly, placing content 400 in database tables tends to make it more difficult for unauthorized users to locate and use the content 400.

In addition, when content 400 is moved between computers (be they clients 114, servers 110, or a mixture), critical portions of the content 400 may be divided between two or more data tables so that theft of any single data table will not provide satisfactory service. As a further precaution, in one embodiment the security manager 402 sends one or more critical portions of content (possibly in data table format) only to a client 114's volatile memory rather than sending all critical portions to nonvolatile memory such as a client 114 disk. Critical portions sent only to client 114 RAM may be scrambled or erased when the client 114 shuts down or is rebooted, making it even more difficult to make illicit copies of the content 400.

Each illustrated content server 110 also includes a launch manager 404 for launching presentations of courseware 400. The launch manager 404 coordinates initial activity such as course 400 selection by the user, any necessary course 400 movement to bring the course 400 to the server 110 using the content movement manager 310, initializing security arrangements with the security manager 402, making the network connection 116 if necessary, and initiating presentation of the course 400 by launching its executable portion or downloading it to the client 114, for instance. In alternative embodiments the launch manager 404 functionality is part of a meter manager 406 or part of the security manager 402.

The meter manager 406 meters content usage. In some embodiments, the metering manager also monitors the connection 116; in other embodiments monitoring is performed by the security manager 402. Regardless, the metering manager 406 keeps track of elapsed time as a measure of the user's use of the content. A portion of the meter manager 406 resides on each client workstation 114 and a portion resides on each content server 110. The two portions of the meter manager 406 create a link which is carried over the connection 116. That is, the metering link rides on top of an Ethernet or other conventional communications link.

In one embodiment, the meter manager 406 creates a start note (event) when courseware is successfully launched. The meter manager 406 will associate this start note with a corresponding end note within one minute (or other defined interval) of the time the user chooses to finish this course 400 presentation. The difference in time between launching the presentation and finishing or interrupting the launched presentation is the metered difference, which will serve as the basis for the invoice presented to the user or to the user's sponsor.

The meter manager 406 may track several open notes for a given client 114, since clients 114 may use operating system software that allows several executables to run at the same time. Metering statistics may be administered using an Oracle database 408 or other database 408 to provide system-wide statistics and system-wide information reports. In one embodiment, meter manager 406 records are constructed in a format that allows their use in conjunction with a rate table, thereby allowing the funds flow manager 308 to create an invoice based on both the particular content 400 used and the elapsed time.

Every rate in the rate table may be associated with a destination account, such as the account of a content 400 vendor or the account of a content-providing site 200 manager. The funds flow manager 308 supports automatic payment using familiar and industry standard credit card payment methods. The funds flow manager 308 accepts electronic billing information from the meter manager 406, and accepts electronically stored payment information such as credit card numbers from the registration module.

The meter manager 406 and/or security manager 402 provide several security features. First, the client 114 desktop is disabled so that the user can only obtain service through the metered and monitored connection 116. Second, each element of potential service such as multimedia content, executables, and courseware tests, is defeated so that its executable portion will not run even if it is located by an unauthorized user. The executables are modified to require security handshakes from the meter manager 406 and/or security manager 402 so the service 400 will not operate at all, or will operate for only a limited period of time, if the metered connection 116 or the meter manager 406 and security manager 402 are not present.

In one embodiment, the client 114 desktop will turn off if the meter manager 406 on the client 114 is not in touch with the meter manager 406 on the content server 110 on a minute-by-minute basis. For the convenience of the user and to ease administration of the system 100, the meter manager 406 can be adjusted to invoke this "dead man's switch" at various time intervals other than one minute. An aggressive approach makes the workstation 114 freeze if a single minute passes with no contact. A more lenient approach may freeze functionality within five minutes after the connection is lost.

In one embodiment, the same polling software element in the meter manager 406 which triggers the dead man's switch also provides a periodic update to the database 408 that is used by the funds flow manager 308 for billing. Each minute that the polling function of the meter manager 406 returns a message from the client 114 to the server 110 indicating that the user ID remains active on the client 114, the database 408 is updated to reflect an additional minute of use for billing purposes.

Polling updates each open request, such as each open courseware presentation. For instance, if in the first minute the user ID requests a login and then makes one open service 400 request, an open event is updated for this user ID in the database 408 table for the time elapsed. If the same user ID then requests a second courseware 400 presentation, each courseware 400 event ID is associated with the login by this user and this client desktop 114, and two time events occur to update the database 408. Thus, subsequent courseware or other service offerings which are opened in the client 114 browser 502 can be added to the time table in the database 408 using the same polling function. The polling function operates similarly for sequential (as opposed to concurrent) activity. If the user ID for a given login closes a courseware presentation 400 or other event ID but retains the login, then while the login time continues to update (enabling billing for use of the personal computer 114), the first courseware 400 offering will end and a new courseware 400 offering can begin during the same login session.

Client

FIG. 5 further illustrates a client 114. As noted above, the client 114 may be a client in the traditional server-client network sense (further configured to operate according to the invention), or the client 114 may be a node in a peer-to-peer network. The client 114 is always a client in the sense that it receives courseware 400 or another service from at least one content server 110.

The client 114 includes operating system software and networking software 500 such as Windows 3.1, Windows 95, Windows 98, Windows 2000, or Windows NT software (marks of Microsoft Corporation), Ethernet software, and/or other software discussed in connection with FIG. 2.

The client 114 also includes a browser 502, such as a Microsoft Internet Explorer or a Netscape browser, through which courseware and/or other content 400 is presented to the user. In addition, the registration module may be browser-based or Oracle-based and browser-transported, so that any client 114 which supports an Internet connection and a Web browser 502 can be used to contact the registration server 108 to create a new user registration.

As previously discussed, the client 114 receives courseware and/or other content 400 from the content server 110. The content 400 may be provided in portions 504 which are defined in one or more of the following ways. First, portions 504 may be critical portions which have been treated for enhanced intellectual property protection as discussed elsewhere herein. Second, the portions 504 may be non-critical portions or a mixture of critical and non-critical portions, which are downloaded early in preparation for later presentation to the user. Early downloading may take advantage of the relatively low cost of telephone connections as opposed to other connections. Finally, content portions 504 may be a mixture of critical and non-critical portions such as episodes or chapters in a presentation, which are sent from the content server 110 to the client 114 in sequence as the user proceeds through the content 400 presentation.

Other components of the client 114, including the security manager 402, meter manager 406, and funds flow manager 308, are discussed elsewhere herein.

Methods Generally

Figure 6:
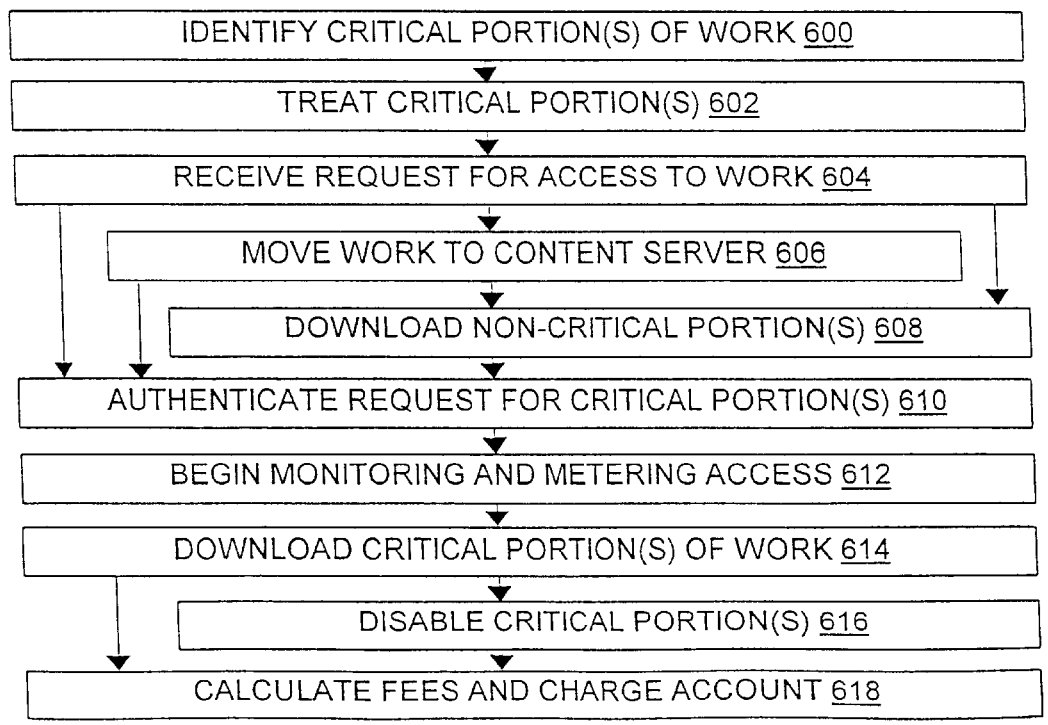
FIG. 6 is a flowchart illustrating methods of the present invention, including steps for providing enhanced security to protect intellectual property rights in critical portions of content.
Figure 7:
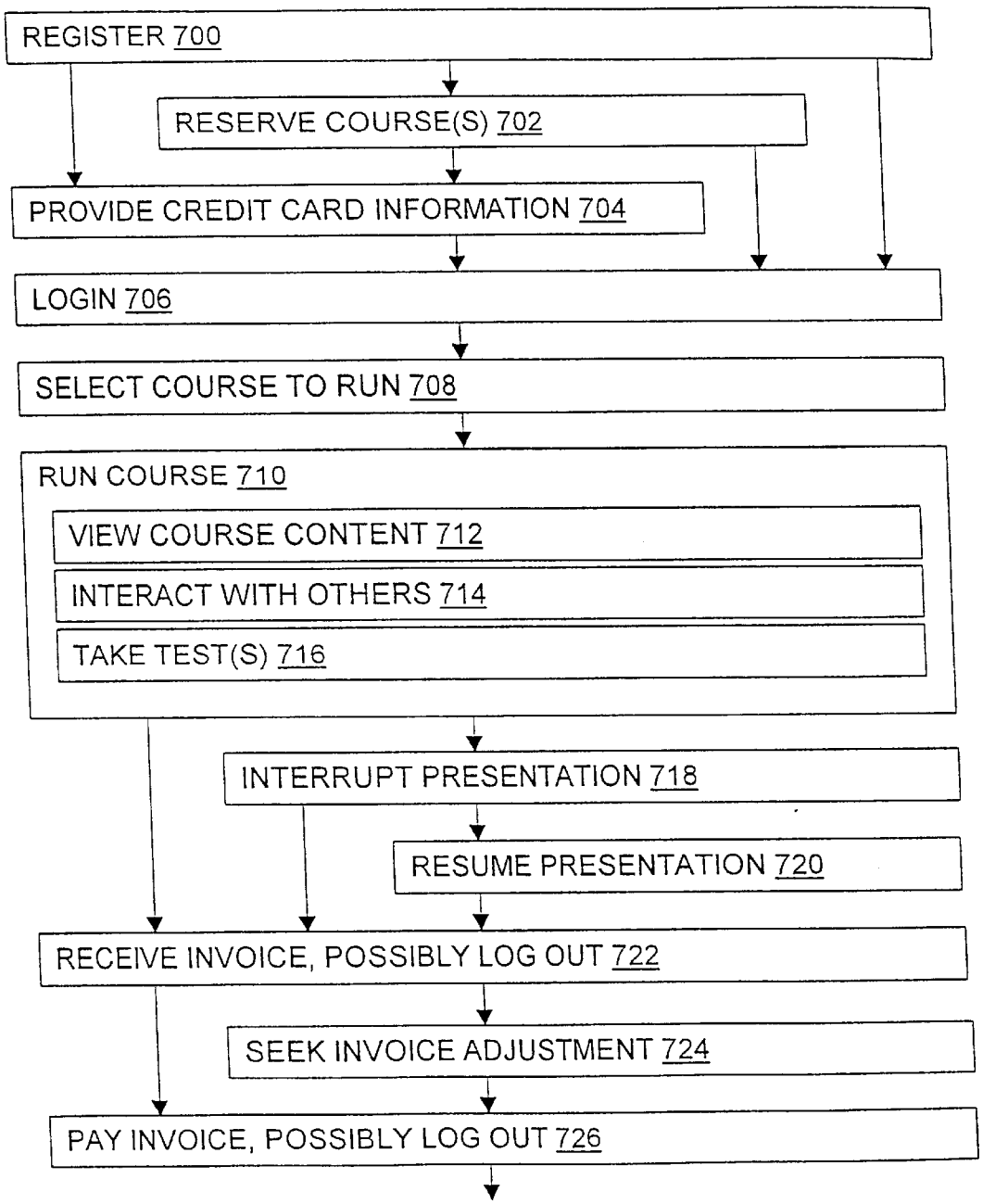
FIG. 7 is a flowchart illustrating methods of operation in the present invention, from the point of view of a courseware user.

FIGS. 6 and 7 further illustrate methods of the present invention. FIG. 6 illustrates generally intellectual property license enforcement methods of the present invention, while FIG. 7 illustrates operational methods of the system 100 from the perspective of a courseware user. Although particular method steps embodying the present invention are expressly illustrated and described herein, it will be appreciated that system and configured storage medium embodiments may be formed according to methods of the present invention. Unless otherwise expressly indicated, the description herein of methods of the present invention therefore extends to corresponding systems and configured storage media, and the description of systems and configured storage media of the present invention extends likewise to corresponding methods.

License Enforcement Methods

In describing FIG. 6, an overview is provided first. Then the individual steps are revisited and discussed in greater detail. During an identifying step 600, at least one critical portion of the content 400 is identified; courseware is one example of the "work" referred to in the corresponding section of the '302 application to which the present application claims priority. The critical portion is separated, encapsulated, encrypted, compressed, created and added, and/or otherwise treated to enable enhanced protection during a treating step 602.

At some later time, a user requests access to the treated content 400 during a requesting step 604. If the content is not already present on a local content server 110, it may be moved to such a server 110 during a step 606. The non-critical portion of the content may be downloaded to the user's location during an optional early downloading step 608.

The user's right to access the critical portion is verified during an authenticating step 610, a metering and monitoring step 612 is started, and the critical portion is then provided to the user during a monitored downloading step 614. If the ongoing or recurring monitoring step 612 detects a violation of the license, a disabling step 616 occurs to prevent or inhibit further use of the treated content. Total license fees based on the metering are calculated and charged during an accounting step 618. Each of these steps will now be described in greater detail.

During the identifying step 600, one or more critical portions of the content 400 are identified. The critical portions should be small enough for rapid treatment during step 602 and rapid downloading during step 614, but critical enough to make most users pay the license fees charged during step 618 rather than use only the non-critical portions. In a multimedia course, for example, critical portions might include executable files or the answers to interactive tests. If the executable is large, critical portions might be part of the executable such as a jump table or a proprietary dynamically linked library file needed to perform I/O operations. Critical portions may be preexisting elements of the content 400, or they may be created and inserted in the content 400. For instance, handshake code may be added to an executable to require periodic successful handshakes with a server 110; if the handshake fails, execution is aborted.

In content 400 that contains no executable computer code, but merely contains audio, visual or other data, critical portions could be initialization or synchronization information, or particular text or images that convey important information to a user or provide important entertainment value. Two of the many possible examples include a final scene of a mystery in which the murderer is revealed, and a checklist summarizing the main steps in a diagnostic technique being taught by courseware 400.

During the treating step 602, critical portions of the content 400 are treated to restrict their unauthorized use. Possible treatments include creating and inserting security codes, separating pre-existing critical portions so they are not downloaded with the non-critical portions, encrypting critical portions, compressing critical portions with a proprietary method (which effectively combines compression and encryption), and/or encapsulating critical portions. One form of encapsulation places the critical portion in a database table, such as a relational database table in a commercial database format used by Oracle, Sybase, Informix, or another familiar vendor. This has the advantage of making critical portions easier for the system 100 to track, and the advantage of hiding critical portions from unauthorized discovery by file system tools that rely on filenames, such as directory listing and directory search tools.

The requesting step 604 may be performed using user login procedures, courseware and/or content selection tools such as menus, and network communication means and methods familiar to those of skill in the relevant arts, including those discussed above in connection with FIG. 1 and/or FIG. 2. The user may also be asked for an account password, a credit card number, or similar guarantee that the license fees for use of the content 400 have been or will be paid. During the requesting step 604, the user is also shown the license agreement terms and conditions, and is then asked to actively accept or decline being bound by the license agreement.

During a content moving step 606, content 400 may be moved from another content server 110 (which may reside in another network 200 or which may be a repository content server 110 as discussed herein) to the local content server 110 which serves the client 114 that is being used (or that will be used) by the user in question. This is accomplished as described in connection with the content movement manager 310.

Content 400 which requires significant download time can be loaded early during the step 608, at least in part, to minimize the delay experienced by users. As the cost of telecommunications services has remained largely constant over time, while the price of memory and computational power have doubled in cost-effectiveness about every eighteen months, the invention allows one to reduce or eliminate the serving of machine readable classes in real-time over the web or the Internet or from a file server. Instead, content 400 is downloaded during step 608 using telecommunications connections which are slow but relatively inexpensive and often billed according to a flat rate rather than connection time.

For instance, knowing that tomorrow is the first day of class in a new course, the multimedia sound and images in the course 400 could be downloaded by students during the night before the course 400 is presented. Critical portions such as the executable code, audiovisual synchronization, or order of presentation could then be downloaded on an as-needed-and-still-authorized basis the next day during step 614.

During the step 612, a timing meter is started in cases where the license fee is not a flat per-use fee but is based instead on the connection time. Monitoring and metering may be separate steps in other methods according to the invention; monitoring is concerned primarily with preventing unauthorized use, while metering is performed as a basis for calculating license fees. Regardless, a system according to the invention starts monitoring the connection 116 to ensure that the use is still authorized and to prevent attempts to obtain a complete copy of the content which is not protected by treatment of critical portions. In particular, initial or further downloading of critical portions during step 614 is not allowed (because part of disabling step 616 occurs) if the monitoring step detects any of the following conditions:

1. The user logged in is not an authorized user (step 604 authentication failed);
2. The user site is not at an expected, authorized network 200 (IP or LAN or MAC or Ethernet and/or socket or port) address; or
3. The user site 114 failed to return an expected periodic security handshake value.

With further reference to the treating step 602 and the monitoring and metering step 612, the present invention allows an intellectual property owner to insert a meter and/or security code into any information set, executable application, image, video, or other computer based work 400 containing intellectual property, and to require a permanent relationship between such works and the metering software 406 which is located on a machine 110 remote from the user site 114. The relationship is preferably simple, lowering the processor and bandwidth requirements of the network communication path 116 between the metering 7 server 110 and the user's site 114. The relationship ensures in most cases that a copy of the work 400 will not be fully available except for licensed time periods and at licensed user sites.

In some embodiments, the content 400 has embedded in it a time stamp, a date stamp, a copy stamp, an Internet Protocol ("IP") address stamp, and/or code enforcing a requirement that the treated content only execute or display on the client 114 CRT when the computer 114 receiving the copy is in a recognized relationship with the computer 110 which sent the course. This relationship is via a POTS line 116, or any telecommunications link 116 which provides constant or reliable presence.

A constant or reliable presence allows a handshake once per configurable time interval or configurable repeated event. The handshake verifies that the user computer 114 in contact with the server 110 is still the same user computer 114, using its IP address or the IP address of its gateway and the password into the gateway required by its Internet service provider. On a local area network 200, the handshake may use the LAN address.

In some embodiments, in addition to the consistent verification that the content 400 is resident on the same user computer 114 connected via the same Internet service provider gateway IP address, both the server 110 with the meter 406 and the computer 114 with the content 400 have identical "random" number generators. These random or pseudo-random numbers must match each interval, or at least be in the same order (it is understood that the content recipient computer 114 may be hundreds of milliseconds away from the server 110 when a connection required for a course 400 travels over part of the Internet).

The random number pairing is once per client-server pair 114, 110; per work-station 114; or per connection 116, depending on the embodiment. In one embodiment, for example, each connection 116 spawned from a content server 110 will have the same random paired number set. One set runs on the server 110, and the same set runs on each user computer 114 which is receiving the content 400 essentially simultaneously. To confirm that the sequence is the same, each computer 110, 114 has a date/time stamp program 402 running, and each date/time stamp must agree at least once per minute. Thus, any computer 114 presenting a course 400 in this way must reset its date/time clock to agree with the content server 110 date/time stamp.

In addition to, or instead of, metering content executables, the present invention can also meter "data transfer executables". Examples of data transfer executables include applications used to operate or access video conferencing cards, network interface cards, CD-ROM controllers, fax systems, modems, and other data transfer devices that can be used in multimedia, audio, or video presentations. For instance, the use of codec (compression-decompression) software and/or hardware which is used to transfer audio or visual data between data formats can be metered according to the invention.

Such metering and authentication systems and methods allow any course 400 to be downloaded to the personal computer 114 of the person who will be taking the course 400. The user's computer 114 may be located at the user's place of employment or at the user's home or at a training facility. An external hard drive can be rented with the course 400 and authentication software mounted. This hard drive can be connected to a personal computer 114 running Windows 95, Windows 2000, Windows NT, Macintosh, or other familiar operating system software, via comm port one or the like (WINDOWS 95, WINDOWS 2000, and WINDOWS NT are marks of Microsoft; MACINTOSH is a mark of Apple). Any personal computer user not needing additional hard drive space can simply make an FTP request, set up the request before going to bed, and find the course 400 (or most of it if critical portions are not available for early downloading) available in the morning. By having much or all of the course 400 available on his or her personal computer 114, much or all of the course 400 will run at the speed of the backplane of that computer 114, which is often substantially faster than an Internet or other network link 116 transfer rate.

In one embodiment, the only information going back and forth via the Internet or via a POTS line connection 116 to the server 110 will be handshaking such as repeats of the IP address of the gateway, pinging, and a stream of paired random numbers to authenticate that the content 400 was obtained from this server 110. The name and password of the student will be sent each minute (or other predetermined interval) as well. Thus, each minute an IP address is sent, a name, a password, and a sequence of paired random or quasi-random numbers. In well under one kilobyte of communication data, the content 400 will be authenticated for another interval of use. As noted, the present invention provides the ability to disable the courseware or other content 400 on the student's personal computer 114 whenever the link 116 with the content server 110 is broken or lost.

To assist in the apprehension of someone who attempts to violate the security system of the present invention, the security system will record where the copy was obtained. A series of copy locations hidden in the content 400, or similar digital watermark information, maintain a record of IP gateway information, password information, and user ID information on how the copies were made, what order the copies were made in, and the time and date stamp of each copy of the content 400. The information can be maintained in a circular buffer holding N records, with information for the N-plus-first copy being copied over the information related to the first copy so that the buffer file size remains the same.

User View of Operational Methods

FIG. 7 illustrates methods for operating the architecture 100 from the point of view of a user. During a registering step 700, the user sits down at a client 114, locates the service provider Web site which is hosted by the registration server 108, and then provides registration information to the registration manager 300. Suitable registration information may include, for instance, the user's name, address, sponsor, password (the password may also be generated by the registration manager 300 rather than be provided by the user), and payment information such as a purchase order number or credit card number.

The registration manager 300 verifies that the username and password are unique by checking the database 302, and then adds a new user registration record to the database 302. Finally, the registration manager 300 notifies the user that registration is complete. If a sponsor was identified by the user, the registration manager 300 optionally also notifies a course administrator at the sponsor by email.

During an optional reserving step 702, the registered user reviews menus of available content and associated times and locations, and places one or more reservations with the reservation manager 304. The reservation manager 304 verifies availability and enters the reservation, using the reservations database 306. If a reserved course is subsequently canceled, some embodiments of the reservation manager 304 send a notice to the registered user by email.

During a payment authorizing step 704, the registered user provides credit card information, and provided implicit or explicit authorization to bill the credit card for services provided. As noted above, this step may be part of the registering step 700. The payment authorizing step 704 may also be performed later, if the necessary information was not available at the time of beginning registration, for instance, or if the user wishes to identify a different credit card after initially registering.

More generally, the method steps illustrated in the Figures and discussed in the text may be performed in various orders, except in those cases in which the results of one step are required as input to another step. For instance, a user must be registered in order to view courseware 400 except to the extent that a particular embodiment provides demonstration courseware at no charge to unregistered users. Likewise, steps may be omitted unless called for in issued claims, regardless of whether they are expressly described as optional in this Detailed Description. For instance, users who are sponsored by a corporation or agency need not provide credit card information during a step 704. Steps may also be repeated (e.g., running several courses), or combined (e.g., providing credit card information during registration), or named differently (e.g., running a course may be referred to as "receiving services").

During a login step 706, a registered user logs into the content server 110. The initial login step 706 may be performed automatically when the user first registers during step 700. Later login steps 706 may be performed each time the user begins a new session at a client 114. During the login step, the user provides a username and password to the security manager 402, which verifies that the corresponding user record exists in the registration database 302 replica on the content server 110.

In addition, if the user has indicated that payment will be by credit card, then the funds flow manager 308 checks the credit card and places a hold on the credit card for an amount which may depend on the prior history of the user, the user's sponsor, the courseware 400 requested, and similar information. In some embodiments, users are not allowed to complete the login process 706 unless the payment information provided by the user or by the user's sponsor has been accepted as valid by the finds flow manager 308.

A user may wish to bill part of a sitting to one account, such as an individual account or a particular employer, and bill a second part of the same day's training to a second account. This may be achieved by logging in under the first account, receiving the first part of the desired services, logging out, and then logging in again with a different user ID and/or password before receiving the second part of the desired services.

During a selecting step 708, the user may select one or more courses 400 to be presented at the client 114. In some cases, the course selection will already have been made by the user's sponsor. Courses 400 may be selected using menus and/or other user interface tools and techniques familiar in the art, which contain course 400 description, cost, and availability data copied from the reservation database 306.

During a step 710, the course 400 is presented to the user at the client 114. This involves sending courseware content 400 from the local content server 110 to the client 114 for viewing during a step 712 by the user. It may also include interaction between the user and other users and/or an instructor during a step 714. Interaction may be provided, for example, by using email, chat rooms, live audio, and/or live video carried over the network connection(s) 116. In addition, during an optional step 716 the user may take one or more interactive tests or quizzes. These may be graded by courseware 400 which is resident on the workstation 114, or the user responses may be transmitted to the content server 110 for grading there, with the results then being sent back to the client 114 and/or to the instructor.

Presentation of courseware during step 710 may be interrupted by a step 718 in response to a key press, mouse click, or other action by the user. For instance, the user may decide not to continue the remainder of the presentation 400 at the present time, or may wish to terminate this presentation and start viewing a different course 400. The user may also simply want to take a temporary break, and then resume the presentation during a subsequent step 720.

During a step 722, the user receives an invoice for services rendered. This may be done in conjunction with a logout during step 722, or logging out may be delayed until a step 726 in which the invoice is paid. From the system's point of view, once a user decides to log out, the meter manager 406 completes the database 408 time table for the user ID, including each event ID associated with each courseware offering, test offering or other service provided during the session. The funds flow manager 308 then uses the database 408 time table and the database 408 rate table to present an invoice on the computer screen in the browser 502.

The user may accept or decline the stated invoice. If the user accepts the invoice, the funds flow manager 308 in the content server 110 communicates that acceptance to the fends flow manager 308 in the registration server 108, which in turn contacts the bank to clear the hold previously placed during step 702, 704, 708 and have the bank apply the credit card charges to the user's card.

If the user declines the invoice, the user may seek an invoice adjustment during a step 724. The local network 200 administrator tries to answer any questions the user has about the invoice and to obtain user acceptance of the invoice, possibly after an adjustment. The local network 200 administrator or other local site personnel are authorized to make adjustments to the bill during step 618. A new invoice amount will then be passed to the funds flow manager 308 for credit card or other payment activity based on the payment terms presented during user registration and this particular session, and the results of any adjustment discussions.

Additional Comments on Security

In the architecture 100, security may be provided in several ways including those expressly noted above. Allowing one and only one person to have a given user ID helps ensure that persons who use content 400 are properly billed for such use, as noted above. But in addition, the user ID and the credit card information help protect the reservation module. If reservations were available without a credit card hold or similar protection, a malicious user could reserve seats in a network 200 (or even reserve all seats in the entire architecture 100) with no legitimate intent to use them. By requiring a credit card for reservation, the reservation module is protected because adequate credit must be available to pay for all reservations placed.

Because content is not stored on the registration server 108, security precautions can be taken that might not otherwise be available. For instance, access to the home page can be disabled so that outsiders cannot input messages or modify HTML code on the registration server 108. Dynamically produced Web pages based on information provided by the user, and created by Oracle or similar software, are also more difficult to modify than static HTML pages. Firewalls, encryption, and other means can also be used to protect credit card numbers of users in time-limited secure transactions without reducing security to allow continual courseware 400 usage from the same server 108. In one embodiment, the registration server 108 exports credit card information to other servers with heightened security; once the export is complete, the credit card information is deleted from the registration server 108.

SUMMARY

The present invention provides systems, devices, and methods for technical enforcement of intellectual property right agreements. A security enforcer is inserted into deliverable content, or a small but critical portion of the content is treated to make it unusable without authorization (unable to execute, for instance), or both treatments are performed. A relationship over time is created between a meter and the treated (secured) content; without the relationship, use of the content is hindered or disabled. The critical portion is never placed in a user's persistent (nonvolatile) storage, such as a disk or tape storage, or alternatively is never placed in persistent storage in usable (executable, runnable, viewable, legible, audible) form. At least part of the meter is remote from the user, being located on a network server 110 while the user uses a client computer 114. The meter is made unique to the content server 110, through the use of IP addresses, coordinated random numbers, and the like. The meter stops running, and the content stops being fully usable, if the client 114 is disconnected for longer than a predetermined period or if the security handshake fails for some other reason.

As used herein, terms such as "a", and "the" and item designations such as "client" are inclusive of one or more of the indicated item. In particular, in the claims a reference to an item means at least one such item is required. When exactly one item is intended, this document will state that requirement expressly.

The invention may be embodied in other specific forms without departing from its essential characteristics. The described embodiments are to be considered in all respects only as illustrative and not restrictive. Headings are for convenience only. The scope of the invention is, therefore, indicated by the appended claims rather than by the foregoing description. All changes which come within the meaning and range of equivalency of the claims are to be embraced within their scope.

What is claimed and desired to be secured by patent is:

1. A multi-level computer architecture for managing content in a shared use operating environment, the architecture including:
    a registration server level including at least one registration server, each registration server comprising a remote registration manager and a registration database for new user registration, and each registration server being further characterized in that it is free of content managed by the architecture;
    a content server level including at least one content server, each content server linked for network communications with a registration server, each content server containing content managed by the architecture, and each content server being further characterized in that it serves such content only for presentation to registered users, namely, users who have previously been registered with a registration server; and
    a client level including at least one client workstation, each client workstation connectable to a content server by a client-server network communications link, and each client workstation being further characterized in that it presents to at least one registered user content which is served over the client-server network communications link by the content server;
    wherein the client-server network communications link permits communication over at least one of: a local area network, a wide area network, a metropolitan area network, the World Wide Web, a private Internet, a secure Internet, a value-added network, a virtual private network, an intranet.

2. The computer architecture of claim 1, wherein the content comprises software.

3. The computer architecture of claim 1, wherein the content comprises digitized sounds.

4. The computer architecture of claim 1, wherein the content comprises digitized images.

5. The computer architecture of claim 1, wherein the content comprises digitized motion paths.

6. The computer architecture of claim 1, wherein the content comprises digitized chemical compounds.

7. The computer architecture of claim 1, wherein the content comprises a other works which can be transmitted over a computer network for presentation to a user and which contains protectable intellectual property.

8. The computer architecture of claim 1, wherein the network communications link comprises a dedicated link.

9. The computer architecture of claim 1, wherein the network communications link comprises a virtual circuit.

10. The computer architecture of claim 1, wherein the network communications link comprises a tunnel through one or more intervening networks.

11. The computer architecture of claim 1 wherein the registration manager accepts a registration for a free demonstration.

12. The computer architecture of claim 1, wherein the registration manager accepts a registration containing a user's credit card information as billing or payment information.

13. The computer architecture of claim 1, wherein the registration manager accepts a registration containing a purchase order number as billing or payment information.

14. The computer architecture of claim 1, wherein the registration manager accepts a registration containing a sponsor identity as billing or payment information.

15. The computer architecture of claim 1, wherein the registration manager accepts a registration containing a user's email address.

16. The computer architecture of claim 1, further comprising a funds flow manager which charges a user for a guaranteed resource reservation regardless of whether the resource is actually used.

17. The computer architecture of claim 1, wherein the registration server presents a user with a menu or a schedule of courseware presentation events.

18. The computer architecture of claim 1, further comprising a funds flow manager which places a hold with a credit card provider or bank before content is presented.

19. The computer architecture of claim 1, further comprising a funds flow manager which initiates a funds transfer from a user's account or a sponsor's account to a service provider's account or a content owner's account.

20. The computer architecture of claim 1, wherein a billing code provided by a user is made into a default payment option to be applied when logging out after future service purchases.

21. The computer architecture of claim 1, wherein a custom menu displays to a user only the content that was approved by a particular entity.

22. The computer architecture of claim 1, further comprising a content movement manager which moves content to a content server in response to an actual request from a user for access.

23. The computer architecture of claim 1, further comprising a content movement manager which moves content to a content server in response to anticipated requests from users for access.

24. The computer architecture of claim 1, wherein at least a portion of the content is compressed.

25. The computer architecture of claim 1, further comprising a security manager which checks the registration database for verification.

26. A multi-level computer architecture for managing content in a shared use operating environment, the architecture including:
- a registration server level including at least one registration server, each registration server comprising a remote registration manager and a registration database for new user registration, and each registration server being further characterized in that it is free of content managed by the architecture;
- a content server level including at least one content server, each content server linked for network communications with a registration server, each content server containing content managed by the architecture, the content containing at least one previously treated critical portion, and each content server being further characterized in that it serves such content critical portions only for presentation to registered users, namely, users who have previously been registered with a registration server; and
- a client level including at least one client workstation, each client workstation connectable to a content server by a client-server network communications link, and each client workstation being further characterized in that it presents to at least one registered user a content critical portion which is served over the client-server network communications link by the content server;
- a funds flow manager for managing content usage payment information;
- a security manager for preventing unauthorized use of the content;
- a meter manager for metering content usage; and
- wherein the content comprises courseware, and the registration server further includes a reservation manager and a reservation database which permits registered users to reserve content.

27. A computer storage medium having a configuration that represents data and instructions which will cause at least a portion of a multi-level computer system to perform method steps for managing courseware in a shared use operating environment, the shared use operating environment including a server and a client connectable by a network communications link to the server, the method comprising the steps of 26.

* * * * *